United States Patent [19]
Grosse-Puppendahl et al.

[11] Patent Number: 5,439,719
[45] Date of Patent: Aug. 8, 1995

[54] PROCESS FOR PREPARING A HIGH-MOLECULAR-WEIGHT POLYESTER

[75] Inventors: Thomas Grosse-Puppendahl, Haltern; Walter K. Homann, Duelmen, both of Germany

[73] Assignee: GAF-Huels Chemie GmbH, Marl, Germany

[21] Appl. No.: 294,922

[22] Filed: Aug. 24, 1994

[30] Foreign Application Priority Data

Sep. 21, 1993 [DE] Germany .................. 43 31 999.8

[51] Int. Cl.$^6$ .................. B32B 23/08; B32B 1/08
[52] U.S. Cl. .................. 428/35.8; 528/272; 528/274; 528/308; 528/308.2; 528/308.3; 528/502 C; 528/503; 522/1; 428/35.7; 428/357; 428/364; 428/373; 428/367
[58] Field of Search .......... 528/272, 274, 308, 308.2, 528/308.3, 308.6, 502, 503; 522/1; 428/357, 364, 373, 376, 35.7, 35.8

[56] References Cited

U.S. PATENT DOCUMENTS 3,650,746  3/1972  Bailey .................. 96/35.1
3,920,877  11/1975  Barber et al. .................. 428/345

*Primary Examiner*—Samuel A. Acquah
*Attorney, Agent, or Firm*—Oblon, Spivak, McClelland, Maier, Neustadt

[57] ABSTRACT

A high-molecular-weight polyester is to be prepared in such a way that it is possible to very quickly and advantageously obtain even relatively small amounts having a very high molecular weight.

This is achieved by preparing a polyester containing proportions of an alkene diol by continuing the polycondensation step until a viscosity number from 5 to 150 cm$^3$/g is reached and subsequently subjecting the polyester thus obtained to a treatment with ionizing radiation until the required viscosity number is reached.

With the aid of the process of the invention it is possible to obtain high-molecular-weight polyesters having the desired property profile.

21 Claims, No Drawings

PROCESS FOR PREPARING A HIGH-MOLECULAR-WEIGHT POLYESTER

BACKGROUND OF THE INVENTION

1. Field of the Invention

The invention relates to a process for preparing a high-molecular-weight polyester by reacting an organic dicarboxylic acid or derivatives thereof with a mixture of alkane- or alkenediols with substantial exclusion of oxygen, in the presence of a condensation catalyst.

2. Discussion of the Background

High-molecular-weight polyesters are excellent materials having specific properties which enable them to be used as raw material for strong high-tech products. It is typical of this application area that frequently, judged according to industrial criteria, relatively small amounts having an exactly prescribed high molecular weight are required.

Since, in large-scale production, polyesters are obtained continuously or batchwise in large amounts having a uniform molecular weight, it is usually uneconomical and also technically difficult to make available fractional amounts having a defined high-molecular weight.

Polyesters having a high molecular weight are conventionally known from the prior art. They contain, inter alia, moieties of unsaturated monomer components which may, if desired, be crosslinked with thermolabile compounds (DE-OS 25 09 726; 25 09 790; 25 52 424). It is characteristic of the conventional polyesters that the final molecular weight has to be set as the polyester is being synthesized. A subsequent manipulation of the molecular weight is impossible or leads to a deterioration in product properties.

It is also known from the prior art to subject polyesters to a solid-phase post-condensation. However, this usually requires relatively long times. Furthermore, only a small increase in the viscosity is achieved.

SUMMARY OF THE INVENTION

It is an object of the present invention to find a way of quickly and advantageously preparing even relatively small amounts of polyester having a high molecular weight.

According to the invention, this object is achieved by a process in which the polycondensation step is continued until a viscosity number in the range from 5 to 150 cm$^3$/g is reached and the polyester thus obtained is subsequently subjected to a treatment with ionizing radiation until the required viscosity number is reached.

DETAILED DESCRIPTION OF THE PREFERRED EMBODIMENT

The polyesters can be prepared by conventional methods known to those of ordinary skill in the art such as by esterification or transesterification and subsequent polycondensation of organic dicarboxylic acids or polyester-forming derivatives thereof and also of the corresponding diol mixture in the presence of condensation catalysts (Sorenson and Campbell, Preparative Methods of Polymer Chemistry, Interscience Publishers Inc., (N.Y.), 1961, pages 111 to 127; Kunststoff-Handbuch, Volume VIII, C. Hanser Verlag Munich, 1973; J. Polym. Sci., Part A 1, 4, pages 1851 to 1859, 1966).

The reaction temperatures lie in the range from 100° to 350° C., preferably in the range from 140° to 280° C. The specified reaction is carried out with substantial exclusion of oxygen. For this reason it is carried out in an inert gas atmosphere. Suitable inert gases are, for example, noble gases such as helium, neon, argon, krypton and xenon, nitrogen, carbon dioxide etc. The reaction is carried out at atmospheric pressure or in vacuo. Preferably, the polycondensation step is carried out in vacuo.

The organic dicarboxylic acid used comprises (cyclo)aliphatic and aromatic acids, alone or mixed. They have from 2 to 36, preferably from 4 to 18, carbon atoms in the carbon skeleton.

(Cyclo)aliphatic acids which may be mentioned are, for example, 1,4-cyclohexanedicarboxylic acid, adipic acid, sebacic acid, azelaic acid, decanedicarboxylic acid, dimeric fatty acids; the main aromatic acids which are suitable are phthalic acid, isophthalic acid, naphthalenedicarboxylic acid and, in particular, terephthalic acid. The acids can in each case be used individually or as mixtures.

The diol component comprises, on the one hand, alkanediols having from 2 to 12 carbon atoms in the carbon chain. Preference is here given to ethylene glycol, butane-1,4-diol and hexane-1,6-diol. On the other hand, alkenediols having from 4 to 12 carbon atoms in the carbon chain are used. Preference is given to using butene-1,4-diol, 2-pentene-1,5-diol, 3-methyl-2-pentene-1,5-diol.

Up to 30 mol % of the alkanediol component of the polyester can be replaced by other diols such as, for example, neopentyl glycol, 1,4- or 1,3-dimethylolcyclohexane or mixtures thereof.

The alkanediol and alkenediol are used in a ratio of from 0.1 to 99.9 mol %: from 99.9 to 0.1 mol %, preferably from 80 to 99.5 mol %: from 20 to 0.5 mol %.

For the purpose of the present invention, polyesters also include block copolyesters. Such products are described, for example, in Chimia 28 (9), pages 544 to 552 (1974) and in Rubber Chemistry and Technology 50, pages 688 to 703 (1977). These block copolyesters contain, in addition to the abovementioned aromatic dicarboxylic acids and diols, a poly(oxyalkylene)diol having a molecular weight (Mn) in the range from about 600 to 2,500. Preferred poly(oxyalkylene)diols are poly(oxyethylene)diol, poly(oxypropylene)diol and poly(oxytetramethylene)diol. The proportion of the poly(oxyalkylene)diols lies in the range from 4 to 40% by weight, preferably from 10 to 35% by weight (based on the total block copolyester).

On completion of the polycondensation, the polyester has a viscosity number from 5 to 150 cm$^3$/g. For use as a molding compound, it is desirable to have a viscosity number in the range from 50 to 150 cm$^3$/g, and for other application areas such as, for example, as polyesterol for polyurethanes or in pulverulent usage forms it is desirable to have a viscosity number in the range from 10 to 60 cm$^3$/g.

Subsequent to the polycondensation step, the polyester is exposed to ionizing radiation. However, it is also possible to further convert the polyester into molding-compounds, films, melt adhesives or powder coatings and only then carry out the irradiation. Finally, it is also possible to first produce the final technical form such as, for example, shaped parts, coatings etc. and then to expose these to irradiation.

After irradiation the polyesters have a viscosity number of $\leq 500$ cm$^3$/g, preferably from 10 to 400 cm$^3$/g and particularly preferably from 20 to 350 cm$^3$/g. It is also possible to irradiate the polyesters until a thermoset product is obtained.

During irradiation, the polyester preferably undergoes an increase in viscosity number of $\geq 5$ cm$^3$/g, more preferably of $\geq 10$ cm$^3$/g, even more preferably of $\geq 20$ cm$^3$/g.

For the second step, the treatment with ionizing radiation, commercial sources of $\beta$, $\gamma$ or UV radiation are used. Thus, $\beta$ radiation sources used are electron beam accelerators having a rating from 150 kV to 5 MV, $\gamma$ radiation sources used are, for example, Co$^{60}$ or Cs$^{137}$ preparations having high radiation power.

The wavelength of the UV radiation used lies in the range from 100 to 600 nm, preferably in the range from 150 to 400 nm. The radiation dose required for the $\beta$ or $\gamma$ radiation lies in the range from 1 to 1,000 kGy, preferably in the range from 20 to 800 kGy.

The polyesters obtained according to the invention can be processed in conventional machines by injection molding or extrusion to give molding compounds.

The polyesters can additionally contain auxiliaries and additives. These can be, for example, nucleating agents, matt finish agents, flow control agents, photoinitiators or other processing aids and also pigments, fillers and reinforcing materials.

Nucleating agents, matt finish agents, flow control agents, photoinitiators or other processing aids can be present in the polyester in amounts of up to 6% by weight, preferably from 0.2 to 3.5% by weight, based on the total mixture.

Pigments, fillers and reinforcing materials are present in the polyester in amounts of up to 60% by weight, preferably from 1 to 50% by weight, based on the total mixture.

The process of the invention has a series of advantages:
- Large amounts of base polycondensate can be prepared quickly and economically, continuously or batchwise.
- In comparison with the prior art, the desired high final viscosity number can be achieved very quickly.
- Relatively small amounts, in particular, of polyester can be economically tailored to a required high viscosity number.
- The good general properties such as thermal and mechanical stability, processing stability, inherent color and the like are not adversely affected.

The polyesters of the invention are used to obtain molding compounds from which films, sheathing, profiles, pipes, hollow articles and also shaped parts can be produced by injection molding or extrusion processes. In addition, the polyesters of the invention can be used in coating agents or adhesives.

The cited parameter J was determined with the aid of the following measurement method:

The determination of the viscosity number (J value) was carried out on solutions of 0.5 g of polyester in 100 ml of phenol/o-dichlorobenzene (weight ratio 1:1) at 25° C. (DIN 16 779).

Having generally described this invention, a further understanding can be obtained by reference to certain specific examples which are provided herein for purposes of illustration only and are not intended to be limiting unless otherwise specified.

EXAMPLES

The experiments denoted by letters are Comparative Examples and are not according to the present invention.

EXAMPLE A 100 parts by weight of a thermoplastic polyester having a J value of 108 cm$^3$/g, which has been prepared according to the known processes by transesterification of dimethyl terephthalate with butane-1,4-diol using iso-propyl titanate as catalyst and subsequent polycondensation under reduced pressure, are exposed to $\beta$ radiation with a dose of 150 kGy. The polyester has a solution viscosity J of 105 cm$^3$/g. On increasing the radiation dose to 300 kGy, the polyester then has a solution viscosity J of 107 cm$^3$/g.

EXAMPLE 1

100 parts by weight of a thermoplastic polyester having a J value of 110 cm$^3$/g, which has been prepared according to the known processes by transesterification of dimethyl terephthalate with a diol mixture comprising 99 mol % of butane-1,4-diol and 1 mol % of 2-butene-1,4-diol using isopropyl titanate as catalyst and subsequent polycondensation under reduced pressure, are exposed to $\beta$ radiation with a dose of 150 kGy. The polyester then has a solution viscosity J of 130 cm$^3$/g. On increasing the radiation dose to 300 kGy, the polyester has a solution viscosity J of 204 cm$^3$/g.

EXAMPLE 2

100 parts by weight of a thermoplastic polyester having a J value of 115 cm$^3$/g, which has been prepared according to the known processes by transesterification of dimethyl terephthalate with a diol mixture comprising 95 mol % of butane-1,4-diol and 5 mol % of 2-butene-1,4-diol using isopropyl titanate as catalyst and subsequent polycondensation under reduced pressure, are exposed to $\beta$ radiation with a dose of 150 kGy. The polyester is no longer completely soluble in the solvent mixture of phenol/o-dichlorobenzene customarily used for the determination of the J value and has gel portions. On increasing the radiation dose to 300 kGy, the products are almost insoluble and have very high proportions of gel.

EXAMPLE 3

100 parts by weight of a thermoplastic polyester having a J value of 111 cm$^3$/g, which has been prepared according to the known processes by transesterification of dimethyl terephthalate with a diol mixture comprising 90 mol % of butane-1,4-diol and 10 mol % of 2-butene-1,4-diol using isopropyl titanate as catalyst and subsequent polycondensation under reduced pressure, are exposed to $\beta$ radiation with a dose of 150 kGy. The polyester is no longer completely soluble in the solvent mixture of phenol/o-dichlorobenzene customarily used for the determination of the J value and has gel portions. On increasing the radiation dose to 300 kGy, the products are almost insoluble and have very high proportions of gel.

EXAMPLE 4

100 parts by weight of a thermoplastic polyester having a J value of 111 cm$^3$/g, which has been prepared according-to the known processes by transesterification of dimethyl terephthalate with a diol mixture comprising 80 mol % of butane-1,4-diol and 20 mol % of 2-butene-1,4-diol using isopropyl titanate as catalyst each subsequent polycondensation under reduced pressure, are exposed to β radiation with a dose of 150 kGy. The polyester is no longer completely soluble in the solvent mixture of phenol/o-dichlorobenzene customarily used for the determination of the J value and has gel portions. On increasing the radiation dose to 300 kGy, the products are almost insoluble and have very high gel portions.

EXAMPLE B 100 parts by weight of a thermoplastic polyester having a J value of 81 $cm^3/g$, which has been prepared according to the known processes by esterification of adipic acid with butane-1,4-diol using iso-propyl titanate as catalyst and subsequent polycondensation under reduced pressure, are exposed to β radiation with a dose of 50 kGy. The polyester then has a solution viscosity J of 80 $cm^3/g$. On increasing the radiation dose to 300 kGy, the polyester then has a solution viscosity J of 78 $cm^3/g$.

EXAMPLE 5

100 parts by weight of a thermoplastic polyester having a J value of 92 $cm^3/g$, which has been prepared according to the known processes by esterification of adipic acid with a diol mixture comprising 80 mol % of butane-1,4-diol and 20 mol % of 2-butene-1,4-diol using iso-propyl titanate as catalyst and subsequent polycondensation under reduced pressure, are exposed to β radiation with a dose of 50 kGy. The polyester then has a solution Viscosity J of 118 $cm^3/g$. On increasing the radiation dose to 300 kGy, the products are almost insoluble and have very high gel portions.

This application claims the benefit of priority under 35 U.S.C. 119 to German Application P 43 31 999.8 filed in Germany on Sep. 21, 1993, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for preparing a polyester, comprising:
   i) reacting an organic dicarboxylic acid with a mixture of alkanediols and alkenediols with substantial exclusion of oxygen and in the presence of a catalyst until a solution viscosity number in the range of from 5 to 150 $cm^3/g$ is reached; and
   ii) subjecting said polyester to ionizing radiation.

2. The process of claim 1, wherein said reacting step i) is continued until a solution viscosity number in the range from 10 to 60 $cm^3/g$ is reached.

3. The process of claim 1, wherein said reacting step i) is continued until a solution viscosity number in the range from 50 to 150 $cm^3/g$ is reached.

4. The process according to claim 1, wherein said ionizing radiation is β- radiation or γ- radiation.

5. The process according to claim 4, wherein said β- or γ- radiation is applied in a dosage of from 1 kGy to 1,000 kGy.

6. The process according to claim 1, wherein said ionizing radiation is UV - radiation in the wavelength range of from 100 to 600 nm.

7. The process according to claim 1, wherein said ionizing radiation is UV - radiation in the wavelength range of from 150 to 400 nm.

8. The process according to claim 1, wherein a thermoset is obtained.

9. The process according to claim 1, wherein said polyester has a solution viscosity number of $\leq 500 cm^3/g$ after being treated with ionizing radiation.

10. The process according to claim 1, wherein said polyester has a solution viscosity number of $\leq 400^3/g$ after being treated with ionizing radiation.

11. The process according to claim 1, wherein said polyester has a solution viscosity number of $\leq 350$ $cm^3/g$ after being treated with ionizing radiation.

12. A polyester produced by a process, comprising:
   i) reacting an organic dicarboxylic acid with a mixture of alkanediols and alkenediols with substantial exclusion of oxygen and in the presence of a catalyst until a solution viscosity number in the range of 5 to 150 $cm^3/g$ is reached; and
   ii) subjecting said polyester to ionizing radiation.

13. The polyester of claim 12, further comprising shaping said polyester of step i) into a shaped article.

14. The polyester of claim 13, wherein said shaped article is produced by the injection-molding or extrusion process.

15. The polyester of claim 13, wherein said shaped article is selected from the group consisting of a profile, a tube, a hollow article and a molding.

16. A film comprising the polyester of claim 12.

17. A sheathing comprising the polyester of claim 12.

18. A fiber comprising the polyester of claim 12.

19. A melt adhesive comprising the polyester of claim 12.

20. A pulverulent coating agent comprising the polyester of claim 12.

21. A coating composition comprising the pulverulent coating agent of claim 20.

* * * * *